United States Patent Office 2,901,195
Patented Aug. 25, 1959

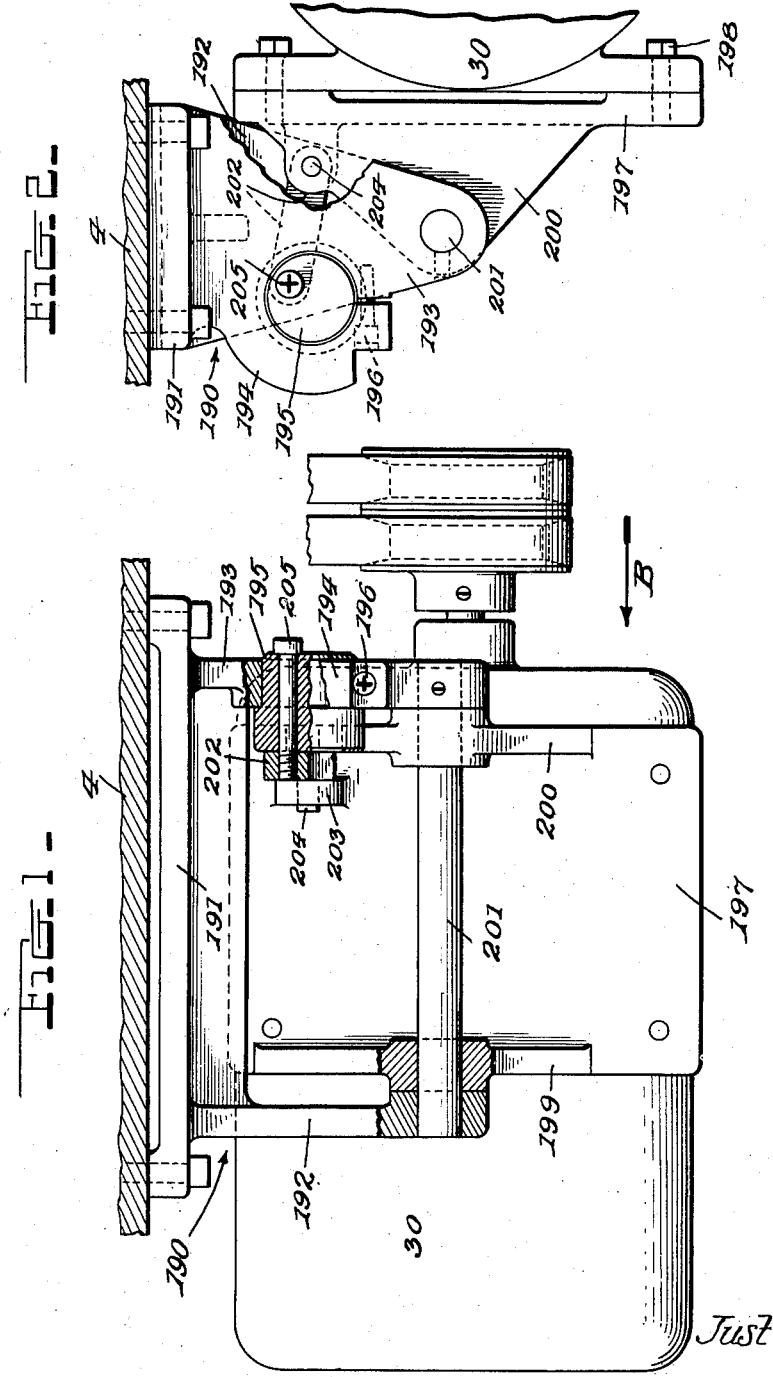

2,901,195
MOTOR MOUNTING MEANS

Justin Simpson, Elmhurst, Ill., assignor to Continental Can Company, Inc., New York, N.Y., a corporation of New York Original application August 3, 1955, Serial No. 526,197. Divided and this application May 13, 1957, Serial No. 658,712

1 Claim. (Cl. 248—16)

This application is a devision of my U.S. application, Ser. No. 526,197, filed August 3, 1955, and entitled "Crown Cap Lining Machine." While the present invention is intended primarily for use with such a machine, it is not restricted to such use but is of general application for adjustably mounting a motor, for example to permit tightening of a belt or chain driven by the motor.

The invention has aimed to provide a new and improved motor mounting means permitting tilting adjustment of the motor by simply turning an eccentric and allowing easy locking after adjustment.

With the above and other objects in view that will hereinafter appear, the nature of the invention will be more clearly understood by reference to the following detailed description, the appended claim and the several views illustrated in the accompanying drawings.

In the drawings:

Figure 1 is a side elevation, partly in section.

Figure 2 is an end elevation as indicated by arrow B of Fig. 1, partly broken away.

A supporting bracket 190 is provided for attachment to a support 4, said bracket 190 comprising a horizontal attaching plate 191 and two spaced arms 192 and 193 projecting downwardly from and integral with said attaching plate 191. The arm 193 has an integral split bearing 194 in which a cylindrical stub 195 is mounted for rotative adjustment, and a clamping screw 196 is provided to contact with said bearing 194 to lock said stub 195 in adjusted position.

A vertical motor mounting base in the form of a plate 197 is provided and upon this plate the motor 30 is secured at 198, this plate 197 has two integral lateral arms 199 and 200, the free ends of which are pivoted to the free ends of the bracket arms 192 and 193 respectively. This pivoting is preferably accomplished by means of a pivot shaft 201 parallel with the axis of the motor 30.

A short link 202 extends from the plate 197 to the inner end of the stub 195. One end of this link 202 is pivoted to the arm 200 and to a lug 203 by means of a pin 204. The other end of the link 202 is pivoted to the inner end of the stub 195 by means of a screw 205, spaced radially from the stub axis.

When the clamping screw 196 is loosened, the motor 30 may be pivotally adjusted about the pivot shaft 201, the stub 195 then turning in the bearing 194. Tightening of the clamping screw 196 will frictionally lock the stub 195 and thus lock the motor 30 in adjusted position. Further frictional locking may be accomplished by tightening the screw 205.

From the foregoing it will be seen that a novel and advantageous construction has been provided and that it permits quick and easy adjustment of the motor as required.

I claim:

A motor mounting means comprising a bracket having an attaching plate and two spaced arms projecting rigidly in the same direction from one side of said attaching plate, one of said arms being provided with a bearing the axis of which is spaced from and parallel with said one side of said attaching plate, a motor mounting base at an angle to said attaching plate and having two spaced arms overlapping the free ends of the aforesaid bracket arms, means pivotally connecting the free ends of said arms of said motor mounting base and said free ends of said bracket arms on aligned axes parallel with the aforesaid axis of said bearing, a rotatively adjustable cylindrical stub mounted in said bearing, a link extending from one end of said stub to said motor mounting base, pivot means pivotally connecting one end of said link with one of said arms of said motor mounting base on an axis parallel with the aforesaid axes, additional pivot means pivotally connecting the other end of said link with said one end of said stub, the axis of said additional pivot means being parallel with and spaced radially from the axis of said stub, and releasable means for holding said stub in rotatively adjusted position, said bearing being integrally joined to said one of said bracket arms and including a longitudinal split, said longitudinally split bearing having a threaded clamping member for contracting it frictionally around said stub, said motor mounting base and said arms thereof being also integrally joined to each other, said additional pivot means comprising a terminally threaded screw extending transversely through aligned bores in said stub, the one of said arms and said other end of said link, the bore in said other end of said link being internally threaded, said threaded clamping member and terminally threaded screw adjustably retaining the parts in a predetermined position.

References Cited in the file of this patent

UNITED STATES PATENTS

| | | |
|---|---|---|
| 1,168,139 | Young | Jan. 11, 1916 |
| 2,487,949 | Shekels | Nov. 15, 1948 |
| 2,689,100 | Voigt | Sept. 14, 1954 |